United States Patent [19]

Eidenbenz et al.

[11] Patent Number: 5,313,740
[45] Date of Patent: May 24, 1994

[54] SCANNING DEVICE AND USE THEREOF

[75] Inventors: Stefan Eidenbenz, Zürich; Claude Nowak, Wettingen, both of Switzerland

[73] Assignee: Mikrona Technologie AG, Spreitenbach, Switzerland

[21] Appl. No.: 699,820

[22] Filed: May 8, 1991

[30] Foreign Application Priority Data

May 16, 1990 [CH] Switzerland .......................... 1656/90

[51] Int. Cl.⁵ .............................................. B24B 17/00
[52] U.S. Cl. ................................ 51/100 R; 51/101 R; 51/127
[58] Field of Search ............. 51/100 R, 101 R, 165 R, 51/217 R, 217 T, 236, 237 R, 127, 34 A, 165.78; 125/11.06; 33/23.08, 23.11

[56] References Cited

U.S. PATENT DOCUMENTS 723,044 3/1903 Seymour ........................ 51/101 R
4,219,974 9/1980 Schmidt ........................ 51/101 R

FOREIGN PATENT DOCUMENTS 2311011 9/1973 Fed. Rep. of Germany .

Primary Examiner—Jack Lavinder
Attorney, Agent, or Firm—Egli International

[57] ABSTRACT

A moulding is contacted by two end pieces of a rotatable first holding part and is scanned by a disk.

For the suppression of relatively large elastic deformations of the moulding by the pressure exerted by the disk, the moulding is also contacted by a second holding part which is located opposite the first holding part, extends into two tips and is mounted so as to be rotatable. For allowing an uninterrupted scanning, the disk is provided with a radial slot which, when the surroundings of the area contacted by the second holding part are scanned, receives said second holding part.

The scanning device can be used for the direct copying of the moulding, rotations of the first holding part being transmitted via bevel gears and a shaft to a fastening bearing a blank and a rotating grinding disk of the same dimension as the disk being moved analogously to said disk.

7 Claims, 1 Drawing Sheet

SCANNING DEVICE AND USE THEREOF

BACKGROUND OF THE INVENTION

1. Field of the Invention

The invention relates to a scanning device according to the preamble of claim 1 and to a use thereof.

2. Description of the Prior Art

A scanning device is described in U.S. Pat. No. 5,135,393 which is hereby incorporated by reference, in which scanning device a moulding is fastened on one side and is scanned by means of a peg or a disk. The scanner controls a processing tool which cuts a copy of the moulding from a blank.

It has been established that, in a scanning device of this type, the achievable precision is possibly limited by elastic deformations of the moulding which are caused by the pressure exerted on it by the scanner.

SUMMARY OF THE INVENTION

The underlying object of the invention is to provide a scanning device of the generic type, with which a more precise scanning of a moulding is possible.

This object is achieved by the features in the characterising clause of claim 1.

The advantages of the invention are to be seen, above all, in the fact that the room for elastic deformations of the moulding has been substantially reduced without the scanning being hindered.

BRIEF DESCRIPTION OF THE DRAWINGS

The invention is explained below with reference to drawings showing only one exemplary embodiment.

DESCRIPTION OF THE PREFERRED EMBODIMENT

Figure 1:
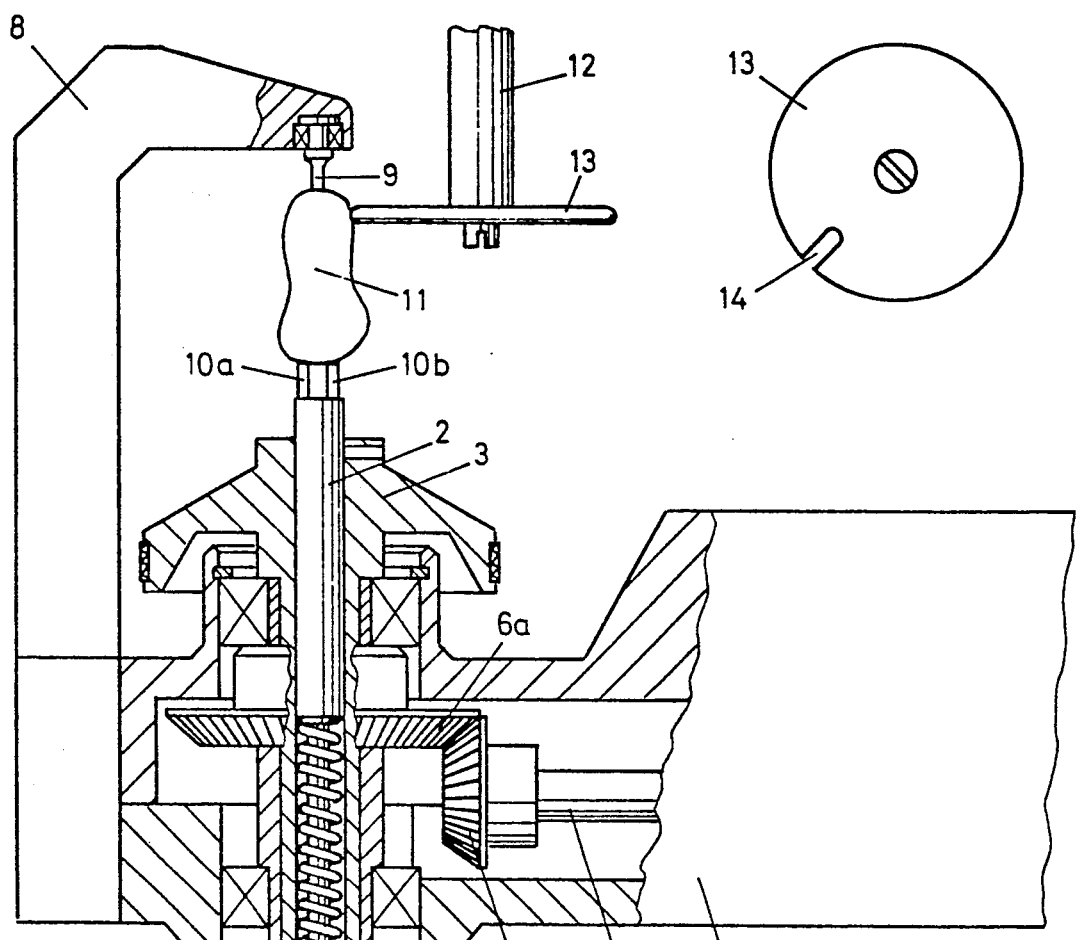
FIG. 1 shows a partially cut-open front view of a scanning device according to the invention which forms a part of a copying device.
Figure 2:
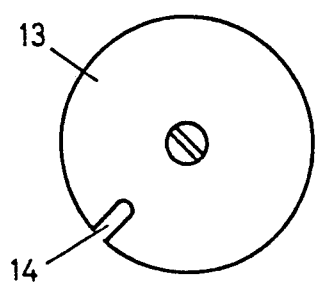
FIG. 2 shows enlarged a plan view of a scanner of the device according to FIG. 1.

The scanning device comprises an arm 1, in the end part of which a first holding part 2 is mounted. The first holding part 2 is guided axially displaceably in a guide part 3 and an axially directed force is applied to it by a spring 4, counter to which force it can be withdrawn by means of a grip 5. The guide part 3 is connected via bevel gears 6a,b to a shaft 7 which forms the connection to a fastening of a blank (not shown) to be processed, said fastening being mechanically of essentially analogous design and being mounted at the opposite end of the arm 1. The blank is held for processing in a manner analogous to that disclosed in U.S. Pat. No. 5,135,393.

Figure 3A:
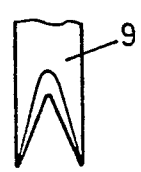
FIG. 3a shows enlarged the end piece of a second holding part of the device according to FIG. 1
Figure 3B:
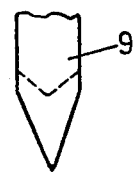
FIG. 3b shows the second holding part according to FIG. 3a, rotated by 90° about its axis.

According to the invention, a strap 8 is mounted at the end of the arm 1, which strap bears a rotatably mounted second holding part 9, the end piece of which, as is visible in FIGS. 3a, 3b, is constructed as a cylindrical peg extending into two tips. The first holding part 2 contains two end pieces 10a,b, each having a tip. A moulding 11 is braced between the first holding part 2 and the second holding part 9 in such a way that it is contacted by both end pieces 10a,b of the first holding part 2 and is thus completely fixed.

Serving for scanning the moulding 11 is a scanner constructed as a disk 13 which is fastened in the centre point on a guide 12. The guide 12 is connected mechanically to a second guide, of which a processing tool, constructed as a rotating grinding disk of the same dimension as the disk 13, is guided for processing the blank, in such a way that both disks execute analogous movements (not shown). Reference is made to U.S. patent application Ser. No. 07/537,186 for the details of the mechanical connections between the scanner and the processing tool on the one hand and the fastenings of the moulding and the blank on the other hand.

According to the invention, the disk 13 is provided with a radial slot 14, the width of which is slightly greater than the diameter of the end part of the second holding part 9. Its depth must correspond to at least half this diameter, but it is preferably greater.

After the first holding part 2 has been withdrawn by means of the grip 5 counter to the force of the spring 4, a moulding 11 to be scanned is braced between said holding part and the second holding part 9. In this case, the two spaced-apart end pieces 10a,b of the first holding part 2, the tips of which penetrate slightly into the moulding 11, ensure that said moulding cannot be rotated in relation to the first holding part 2. Since the second holding part 9 is mounted so as to be rotatable, although it also has two, albeit only slightly spaced-apart contact points with the moulding 11—its two tips likewise penetrate slightly into said moulding—it does not prevent a rotation caused to said moulding by the first holding part 2. Apart from being swivelled about its axis by a rotation of the first holding part 2, which rotation can be transmitted via the bevel gears 6a,b and the shaft 7 onto the fastening of the blank, the moulding 11 can also be swivelled by a rotary movement of the arm 1 about an axis of rotation perpendicular to the first axis of rotation. The disk 13 can be moved virtually freely.

When scanning using a solid disk, the second holding part 9 would be in the way during the scanning of the upper side and a part of the surface of the moulding 11 would have to be left out by the scanning. This problem would be alleviated slightly using a peg-shaped scanner since the inaccessible surface would then generally be smaller. However, for the production of copies of the moulding, peg-shaped processing tools are less suitable since only a low processing speed can be achieved using such tools and, in addition, their service life is shorter. However, since the shape of the scanner must correspond to the shape of the processing tool, at least where said scanner comes into contact with the moulding, a scanning, which is as complete as possible, of the relevant parts of the moulding 11 should be achieved using a scanner of a more general shape. This is made possible by the slot 14, in that the scanning of the part of the surface of the moulding 11 facing the second holding part 9 takes place in such a way that the slot 14 is directed towards the second holding part 9 and, with further movement of the disk 13 towards said holding part, is received in said slot, with the result that it is possible virtually without restriction to scan the regions which surround the area, located directly in the contact region between the second holding part 9 and the moulding 11, the direct scanning of which area is not possible. As far as the said contact area is concerned, an interpolation over the direct surroundings, substituting the direct scanning, automatically results for said contact area. If the contact area does not have an exceptionally large curvature—which will be taken into consideration when the moulding 11 is braced—an exceptionally precise scanning can be achieved throughout in this manner.

It should also be mentioned that scanning devices according to the invention are not only suitable for use in copying devices of the type described, but generally for determining a three-dimensional shape, e.g. for the purpose of storage by electronic means for the later production of copies or for other purposes.

We claim:

1. A scanning device for scanning a moulding which has at least one first holding part for fastening the moulding, a tool for cutting a blank, said tool cuts along a circular line of a particular diameter, a scanner having a scanning edge of exactly the same diameter as said circular line, and a second holding part which extends towards the first holding part for fixing the moulding, said scanning edge of the scanner having a recess therein that is of a depth necessary to receive at least half of said second holding part therein.

2. The scanning device according to claim 1, the scanner of which is a disk, fastened at the geometrical centre point, and characterised in that the recess is constructed as a radial slot.

3. The scanning device according to claim 1, characterised in that, at its end intended for contacting the moulding, the second holding part extends into at least two tips and is mounted so as to be rotatable.

4. The scanning device according to claim 1, characterised in that the first holding part has two end pieces, each having a tip, for contacting the moulding.

5. The scanning device according to claim 1, characterised in that one of the holding parts is mounted in such a way that it can be withdrawn from the moulding counter to the force of a spring.

6. The scanning device according to claim 1, wherein said tool is a rotating processing tool for processing said blank by copying of said moulding via said scanner which is guided along the surface of said moulding, said rotating processing tool is constructed as a rotating body which is terminated by a flat surface perpendicular to its axis and the radius of which corresponds to that of the circular line which the edge of the scanner follows.

7. The scanning device according to claim 6, wherein said rotating processing tool is constructed as a disk.

* * * * *